US012739090B2

(12) United States Patent
Hong

(10) Patent No.: US 12,739,090 B2
(45) Date of Patent: Sep. 15, 2026

(54) NETWORKING METHOD AND APPARATUS THEREFOR

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 365 days.

(21) Appl. No.: 18/565,513

(22) PCT Filed: May 31, 2021

(86) PCT No.: PCT/CN2021/097296
§ 371 (c)(1),
(2) Date: Nov. 30, 2023

(87) PCT Pub. No.: WO2022/252022
PCT Pub. Date: Dec. 8, 2022

(65) Prior Publication Data

US 2024/0305439 A1 Sep. 12, 2024

(51) Int. Cl.
*H04L 5/14* (2006.01)
*H04L 5/00* (2006.01)

(52) U.S. Cl.
CPC .............. *H04L 5/14* (2013.01); *H04L 5/0094* (2013.01)

(58) Field of Classification Search
None
See application file for complete search history.

(56) References Cited

U.S. PATENT DOCUMENTS 9,838,193 B2 12/2017 Kazmi et al.
10,681,587 B2 6/2020 Lin et al.
11,832,322 B2 * 11/2023 Liu ........................ H04W 76/15
2017/0054544 A1 2/2017 Kazmi et al.
2018/0279172 A1 9/2018 Lin et al.
2019/0021084 A1 * 1/2019 Stirling-Gallacher ........................ H04W 72/51
2020/0280880 A1 9/2020 Lin et al.
(Continued)

FOREIGN PATENT DOCUMENTS

CN 105376841 A 3/2016
CN 106817725 A 6/2017
(Continued)

OTHER PUBLICATIONS

The First Office Action issued in CN Application No. 202180001652.5 dated Oct. 31, 2024 with English Translation, (13p).
(Continued)

*Primary Examiner* — Luna Weissberger
(74) *Attorney, Agent, or Firm* — Arch & Lake LLP; Hao Tan; Shen Wang

(57) ABSTRACT

Disclosed in embodiments of the present invention are a networking method and an apparatus therefor, which can be applied to the technical field of communications. The method executed by a first access network device includes: receiving first indication information, wherein the first indication information is used for indicating full-duplex communication information of a second access network device, such that interference with the second access network device can be avoided as much as possible during full-duplex communications.

14 Claims, 3 Drawing Sheets sending second indication information, wherein the second indication information is used to indicate full duplex communication information of the first access network device — 31 receiving first indication information, wherein the first indication information is used to indicate full duplex communication information of a second access network device — 32 sending the second indication information through the next generation access network device configuration update message, when it is determined that the full duplex communication information of the first access network device has changed — 33

(56) References Cited

U.S. PATENT DOCUMENTS

2020/0374958 A1 11/2020 Liu et al.
2022/0182160 A1* 6/2022 Su .......................... H04B 1/525

FOREIGN PATENT DOCUMENTS

CN 107295815 A 10/2017
CN 110167199 A 8/2019

OTHER PUBLICATIONS

International Search Report of PCT/CN2021/097296 dated Jan. 30, 2022 with English translation, (4p).

* cited by examiner

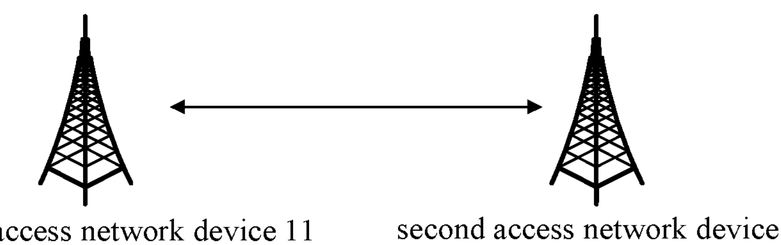
FIG. 1
receiving first indication information, wherein the first indication information is used to indicate full duplex communication information of a second access network device
21
FIG. 2
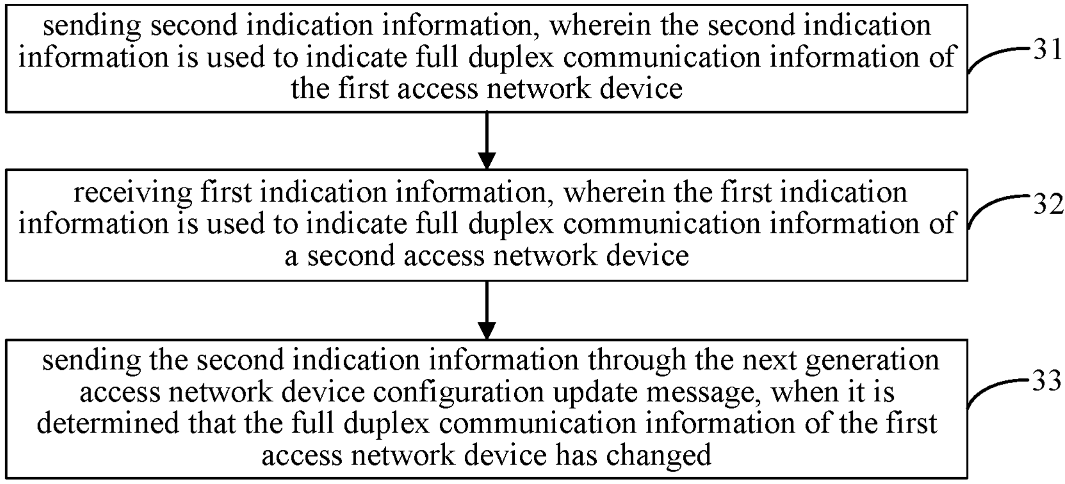
FIG. 3

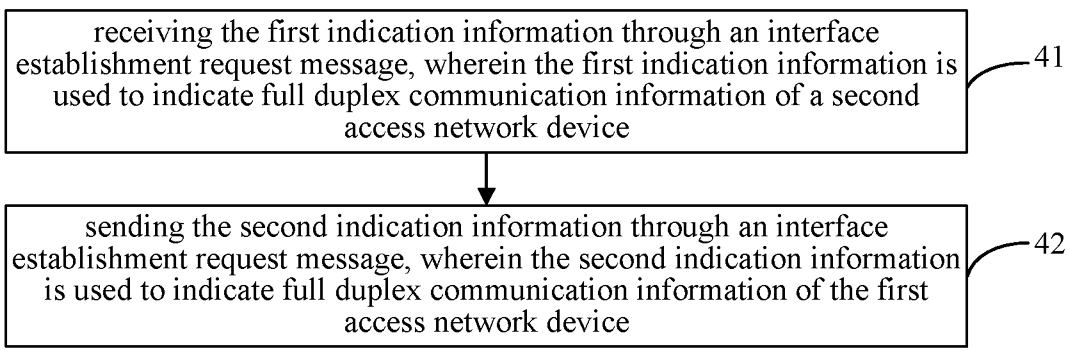

FIG. 4 sending the second indication information through an interface establishment request message, wherein the second indication information is used to indicate full duplex communication information of the first access network device

51 receiving the first indication information through an interface establishment response message, wherein the first indication information is used to indicate full duplex communication information of a second access network device

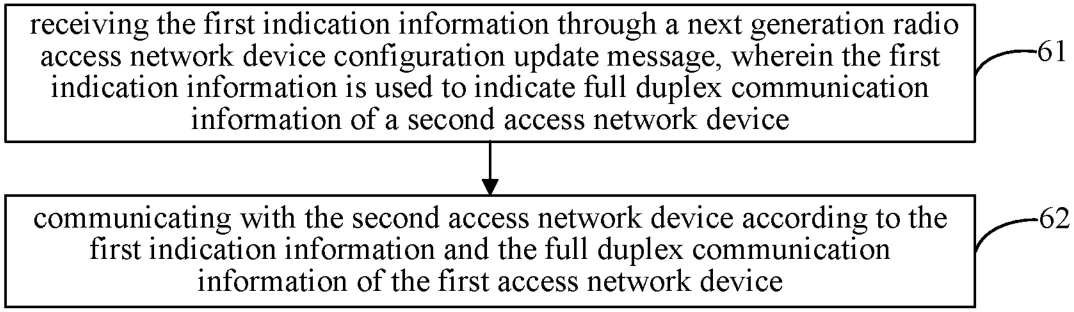

FIG. 6

NETWORKING METHOD AND APPARATUS THEREFOR

CROSS REFERENCE

The present application is a U.S. national phase application of International Application No. PCT/CN2021/097296, filed on May 31, 2021, the contents of which are incorporated herein by reference in their entireties for all purposes.

TECHNICAL FIELD

The present disclosure relates to the field of communication technology, and in particular, to a networking method and an apparatus therefor.

BACKGROUND

Generally, full duplex communication technology means that mutual business transmission between devices can occur at the same time and the same frequency bandwidth. That is, both parties of the communication can send and receive information at the same time. However, if full duplex communication technology is directly applied to communication systems, it may cause serious interference to various access network devices. Therefore, how to reduce interference when each access network device uses full duplex communication has become an urgent problem that needs to be solved.

SUMMARY

Embodiments of the present disclosure provide a networking method and apparatus, which can be applied in the field of communication technology. In a first aspect, embodiments of the present disclosure provide a method of networking, performed by a first access network device, and the method including: receiving first indication information, wherein the first indication information is used to indicate full duplex communication information of a second access network device.

In a second aspect, embodiments of the present disclosure provide a communication apparatus, which has some or all functions of implementing the first access network device in the method described in the first aspect. For example, the functions of the communication apparatus can have functions of some or all embodiment of the present disclosure, and can also have the functions of independently implementing any embodiment of the present disclosure. The functions can be realized by hardware, or by hardware executing corresponding software. The hardware or software includes one or more units or modules corresponding to the above functions.

In a third aspect, embodiments of the present disclosure provide a communication apparatus, which includes a processor, and when the processor calls a computer program in a memory, the method described in the first aspect is executed.

In a fourth aspect, an embodiment of the present disclosure provides a communication apparatus, which includes a processor and a memory, and a computer program is stored in the memory. The processor executes the computer program stored in the memory, so that the communication apparatus performs the method described in the first aspect.

In a fifth aspect, an embodiment of the present disclosure provides a communication apparatus, which includes a processor and an interface circuit. The interface circuit is used for receiving code instructions and transmitting them to the processor, and the processor is used for running the code instructions to enable the apparatus to perform the method described in the first aspect.

In a sixth aspect, an embodiment of the present disclosure provides a networking system, which includes the communication apparatus described in the second aspect, or the system includes the communication apparatus described in the third aspect, or the system includes the communication apparatus described in the fourth aspect, or the system includes the communication apparatus described in the fifth aspect.

In a seventh aspect, an embodiment of the present disclosure provides a non-transitory computer-readable storage medium, for storing instructions used by the first access network device, and when the instructions are executed, the method described in the first aspect is implemented.

In an eighth aspect, the present disclosure also provides a computer program product including a computer program, which, when run on a computer, causes the computer to perform the method described in the first aspect.

In a ninth aspect, the present disclosure provides a chip system, which includes at least one processor and interface, and is used for supporting a first access network device to realize functions related to the first aspect, for example, determining or processing at least one of data and information related to the above method. In a possible design, the chip system further includes a memory, and the memory is used for storing necessary computer programs and data of the first access network device. The chip system can be composed of chips, and can also include chips and other discrete devices.

In a tenth aspect, the present disclosure provides a non-transitory computer program, which when run on a computer, causes the computer to perform the method described in the first aspect.

BRIEF DESCRIPTION OF THE DRAWINGS

In order to more clearly illustrate the technical solutions in the embodiments of the disclosure or the background technology, the drawings required to be used in the embodiments or the background technology of the disclosure will be described below.

FIG. 1 is a schematic architectural diagram of a communication system provided by an embodiment of the present disclosure;

FIG. 2 is a schematic flowchart of a networking method provided by an embodiment of the present disclosure;

FIG. 3 is a schematic flowchart of a networking method provided by another embodiment of the present disclosure;

FIG. 4 is a schematic flowchart of a networking method provided by another embodiment of the present disclosure;

FIG. 5 is a schematic flowchart of a networking method provided by another embodiment of the present disclosure;

FIG. 6 is a schematic flowchart of a networking method provided by another embodiment of the present disclosure;

DETAILED DESCRIPTION

Figure 7:
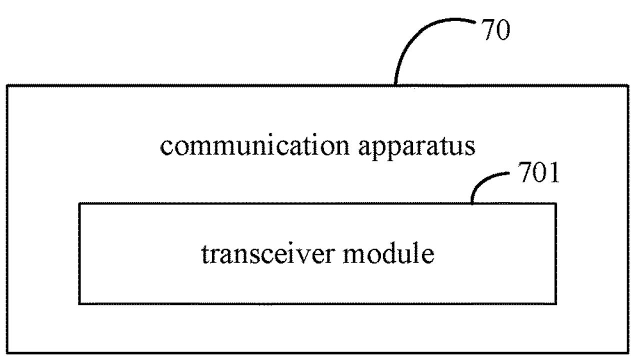
FIG. 7 is a schematic structural diagram of a communication apparatus according to an embodiment of the present disclosure.

For ease of understanding, terminology involved in this disclosure is first introduced.

1. Full Duplex Communication

Full duplex communication can be divided into frequency division multiplexing (FDM) and time division multiplexing (TDM).

FDM means that the entire transmission frequency band can be divided into several frequency channels. Each user can occupy one frequency channel to transmit data, and a protective frequency band is left between frequency channels.

In addition, TDM means that time can be divided into small time slices, and each time slice is divided into several channels (time slots). Each user can occupy one channel to transmit data.

In order to better understand the networking method disclosed in the embodiment of the present disclosure, the communication system to which the embodiment of the present disclosure is applicable is first described below.

Please refer to FIG. 1, which is a schematic architectural diagram of a communication system provided by an embodiment of the present disclosure. The communication system may include but not limited to two or more access network devices. The number and form of devices shown in FIG. 1 are only for examples and do not constitute a limitation on the embodiments of the present disclosure. In actual applications, two or more access network devices may be included. For example, the communication system shown in FIG. 1 includes a first access network device 11 and a second access network device 12.

It should be noted that the technical solutions of the embodiments of the present disclosure can be applied to various communication systems, for example, long term evolution (LTE) systems, 5G new radio (NR) systems, or other future new mobile communication systems.

The first access network device 11 and the second access network device 12 in the embodiment of the present disclosure are entities on the network side for sending or receiving signals. For example, the first access network device 11 may be an evolved base station (evolved NodeB, eNB), a transmission reception point (TRP), a next generation base station (next generation NodeB, gNB) in an NR system, a base station in other future mobile communication systems, or an access node in a wireless fidelity (WiFi) system, or the like. The embodiments of the present disclosure do not limit the specific technologies and specific device forms used by the first access network device 11 and the second access network device 12.

The first access network device 11 and the second access network device 12 provided by the embodiment of the present disclosure may be composed of a central unit (CU) and a distributed unit (DU). The CU may also be called a control unit. The CU-DU structure can be used to separate protocol layers of the first access network device, such as the base station. The functions of some protocol layer are centrally controlled by the CU, and functions of the remaining part or all protocol layers are distributed in the DU, and the CU centrally controls the DU.

It can be understood that the communication system described in the embodiments of the present disclosure is to more clearly illustrate the technical solutions of embodiments of the present disclosure, and does not constitute a limitation on the technical solutions provided by the embodiments of the present disclosure. As those of ordinary skill in the art will know that, with the evolution of system architecture and the emergence of new business scenarios, the technical solutions provided by the embodiments of the present disclosure are also applicable to similar technical problems.

The networking method and apparatus provided by the present disclosure will be introduced in detail below with reference to the accompanying drawings.

Please refer to FIG. 2, FIG. 2 is a schematic flowchart of a networking method provided by an embodiment of the present disclosure. The method is executed by a first access network device. As shown in FIG. 2, the method may include but not limited to the following step:

step 21: receiving first indication information, wherein the first indication information is used to indicate full duplex communication information of a second access network device.

Generally, each access network device can perform full duplex communication based on the full duplex communication information supported by itself. If a plurality of access network devices use the same full duplex communication information for full duplex communication at the same time, it may cause interference to communication transmission, thus affecting the quality and efficiency of the communication transmission.

In the embodiment of the present disclosure, the first access network device may first receive the first indication information, and then obtain the full duplex communication information of the second access network device according to the indication of the first indication information. Therefore, when the first access network device performs full duplex communication with the terminal device, the interference with the second access network device can be avoided as much as possible. In this way, the interference during the full duplex communication by access network devices can be reduced as much as possible, and the quality and efficiency of communication transmission are improved.

Optionally, the full duplex communication information may be whether the second access network device supports full duplex.

For example, the first indication information indicates that the second access network device can support full duplex. After receiving the first indication information, the first access network device can learn that the second access network device can support full duplex according to the indication of the first indication information. Therefore, the first access network device can determine that it may be affected by the second access network device when performing full duplex communication with the terminal device, so that the full duplex communication can be specially processed as needed, to try to avoid interference of the full duplex communication performed by the second access network device to the full duplex communication performed by the first access network device as much as possible, and to improve the quality and efficiency of communication transmission.

Optionally, the full duplex communication information may be: full duplex capability information supported by the second access network device.

Optionally, full duplex capability information supported by the second access network device may include at least one of the following: supported full duplex frequency resources; supported full duplex time domain resources; and supported full duplex types.

The full duplex type can be FDM or TDM.

For example, the first indication information indicates that the full duplex frequency resource supported by the second access network device is F1. After receiving the first indication information, the first access network device can learn that the full duplex frequency resource supported by the second access network device is F1 according to the indication of the first indication information. Therefore, when the first access network device performs full duplex communication with the terminal device, it can perform the full duplex communication on a different frequency resource F2, to avoid interference of the full duplex communication performed by the second access network device to the full duplex communication performed by the first access network device as much as possible, and improve the quality and efficiency of communication transmission.

Alternatively, the first indication information indicates that the full duplex frequency resource supported by the second access network device is F1. After receiving the first indication information, the first access network device can learn that the full duplex frequency resource supported by the second access network device is F1 according to the indication of the first indication information. Therefore, when the first access network device performs full duplex communication with the second access network device, the communication can be performed on the frequency resource F1, to improve the quality and efficiency of communication transmission between them two.

Alternatively, the first indication information indicates that the full duplex time domain resource supported by the second access network device is T1. After receiving the first indication information, the first access network device can learn that the full duplex time domain resource supported by the second access network device is T1 according to the indication of the first indication information. Therefore, when the first access network device performs full duplex communication with the terminal device, it can perform the full duplex communication on a different time domain resource T2, so as to avoid the interference of the full duplex communication performed by the second access network device to the full duplex communication performed by the first access network device as much as possible, and improve the quality and efficiency of communication transmission.

Alternatively, the first indication information indicates that the full duplex type supported by the second access network device is FDM. After receiving the first indication information, the first access network device can learn that the full duplex type supported by the second access network device is FDM according to the indication of the first indication information. Therefore, the first access network device can determine the manner in which it performs full duplex communication based on the full duplex type supported by the second access network device and the full duplex type supported by itself. For example, the full duplex type supported by the first access network device is also FDM, and the corresponding frequency bands of the access network device are F1 and F2, then the first access network device can use either frequency band F1 or F2 to perform full duplex communication. Correspondingly, the second access network device can use another frequency band for full duplex communication, to try to avoid interference when the access network devices use full duplex communication as much as possible and improve the quality and efficiency of communication transmission.

Alternatively, the first indication information indicates that the full duplex frequency resource supported by the second access network device is F1 and the time domain resource is T1. After receiving the first indication information, the first access network device can learn that the second access network device can use the frequency resource F1 to perform full duplex within the time domain resource T1 according to the indication of the first indication information. Therefore, when the first access network device performs full duplex communication with the terminal device, it can use the frequency resource F1 within a time resource different from T1, or it can also use a frequency resource different from F1 within the time domain resource T1, to try to avoid the interference of the full duplex communication performed by the second access network device to the full duplex communication performed by the first access network device as much as possible, and improve the quality and efficiency of communication transmission.

Optionally, the full duplex communication information may be: configuration information of full duplex communication of the second access network device.

The configuration information of full duplex communication may be that the full duplex communication can be supported in which frequency resources and within which time resources, etc. This disclosure does not limit this.

For example, the first indication information indicates that the configuration information of full duplex communication of the second access network device is that the full duplex communication can be supported by the frequency resource F1 within the time resource T1 and by the frequency resource F3 within the time resource T3. After receiving the first indication information, the first access network device can learn that the second access network device supports full duplex communication of the frequency resource F1 within the time resource T1 and the frequency resource F3 within the time resource T3 according to the indication of the first indication information. Therefore, when the first access network device performs full duplex communication with the terminal device, it can be performed by using the frequency resource F1 within a time resource different from T1, or it can also be performed by using a frequency resource different from F1 within the time domain resource T1, or it can also be performed by using the frequency resource F3 within a time resource different from T3, or it can also be performed by using a frequency resource different from F3 within the time domain resource T3, to try to avoid the interference of the full duplex communication performed by the second access network device to the full duplex communication performed by the first access network device as much as possible, and improve the quality and efficiency of communication transmission.

It should be noted that the first indication information may indicate one or more of the above. For example, it may indicate whether the second access network device supports full duplex and the full duplex capability information supported by the second access network device, or the first indication information may indicate whether the second access network device supports full duplex, the full duplex capability information supported by the second access network device, and the configuration information of full duplex communication of the second access network device, etc., which is not limited by this disclosure.

By implementing the embodiments of the present disclosure, the first access network device can obtain the full duplex communication information of the second access network device based on the received first indication information, so that interference with the second access network device can be avoided as much as possible when performing full duplex communication. In this way, the interference during the full duplex communication by access network devices can be reduced as much as possible, and the quality and efficiency of communication transmission are improved.

Please refer to FIG. 3, FIG. 3 is a schematic flowchart of a networking method provided by an embodiment of the present disclosure. The method is executed by the first access network device. As shown in FIG. 3, the method may include but not limited to the following steps.

In step 31, second indication information is sent, wherein the second indication information is used to indicate full duplex communication information of the first access network device.

In this disclosed embodiment, the first access network device can send the second indication information to the second access network device, so that the second access network device can obtain the full duplex communication information of the first access network device, and then avoid the interference with the first access network device as much as possible when performing full duplex communication with the terminal device. This can minimize interference when the access network device uses full duplex communication and improve the quality and efficiency of communication transmission.

Alternatively, the first access network device may also send the second indication information to other access network devices, so that other access network devices can obtain the full duplex communication information of the first access network device, which can avoid interference with the first access network device as much as possible when performing full duplex communication with the terminal device. In this way, this can minimize interference when the access network device uses full duplex communication and improve the quality and efficiency of communication transmission.

In step 32, first indication information is received, wherein the first indication information is used to indicate full duplex communication information of a second access network device.

It should be noted that, for the specific content and implementation manner of step 32, reference can be made to the descriptions of other embodiments of the present disclosure, and will not be described again here.

In step 33, when it is determined that the full duplex communication information of the first access network device has changed, the second indication information is sent through the next generation access network device configuration update message.

It can be understood that, when the full duplex communication information of the first access network device has changed, the second indication information sent through the next generation radio access network (NG RAN) device configuration update (NG RAN node configuration update) message may indicate the change of the full duplex communication information of the first access network device, or may also indicate the full duplex communication information supported by the first access network device after the change, etc. Therefore, other access network devices can learn the change of the full duplex communication information of the first access network device according to the second indication information, and then interference with the first access network device can be avoided as much as possible when performing full duplex communication with the terminal device. In this way, this can minimize interference when the access network device uses full duplex communication and improve the quality and efficiency of communication transmission.

It can be understood that, the NG RAN node configuration update message can be extended, so that the second indication information carried in the message can indicate the full duplex communication information of the first access network device.

For example, the protocol stipulates that a bit can be added to the NG RAN node configuration update message, and the added bit is used to indicate the full duplex communication information of the first access network device. Therefore, after receiving the NG RAN node configuration update message, other access network devices can determine the full duplex communication information of the first access network device based on the newly added bit in the message according to the protocol.

It should be noted that the above example is only a schematic illustration and cannot be used as a limitation on the manner in which the interface establishment response message is expanded in the embodiment of the present disclosure.

It should be noted that this disclosure does not limit the order in which step 32 and step 33 are performed.

By implementing the embodiments of the present disclosure, the first access network device can first send the second indication information, to indicate the full duplex communication information of the first access network device, and then can obtain the full duplex communication information of the second access network device based on the received first indication information. When it is determined that the full duplex communication information of the first access network device has changed, the second indication information is sent through the next generation access network device configuration update message. This can minimize interference when the access network device uses full duplex communication and improve the quality and efficiency of communication transmission.

Please refer to FIG. 4, FIG. 4 is a schematic flowchart of a networking method provided by an embodiment of the present disclosure. The method is executed by the first access network device. As shown in FIG. 4, the method may include but not limited to the following steps.

In step 41, the first indication information is received through an interface establishment request message, wherein the first indication information is used to indicate full duplex communication information of a second access network device.

The interface establishment request message may be an Xnsetup request message, or it may be other interface establishment request messages, etc. This disclosure does not limit this.

In this embodiment of the present disclosure, the first access network device may receive the first indication information through an interface establishment request message, and then obtain the full duplex communication information of the second access network device according to the indication of the first indication information. Therefore, when the first access network device performs full duplex communication with the terminal device, the interference with the second access network device can be avoided as much as possible. In this way, the interference during the full duplex communication by access network devices can be reduced as much as possible, and the quality and efficiency of communication transmission are improved.

Optionally, the first indication information may be included in at least one of the following information units: a served cell information NR information unit in a list of served cells NR information unit; a neighbour cell information NR information unit in a list of served cells NR information unit; an evolved universal terrestrial radio access E-UTRA information unit of neighbour cell information in a list of served cells NR information unit; a served cell information E-UTRA information unit in a list of served cells E-UTRA information unit; a neighbour cell information NR information unit in a list of served cells E-UTRA information unit; a neighbour cell information E-UTRA information unit in a list of served cells E-UTRA information unit; a designated information unit in a list of served cells NR information unit; a designated information unit in a list of served cells E-UTRA information unit.

It can be understood that the served cell information NR information unit in the list of served cells NR information unit can be extended, so that the served cell information NR information unit can carry the first indication information.

For example, the protocol stipulates that a bit can be added to the served cell information NR information unit in the list of served cells NR information unit, and the added bit is used to indicate the full duplex communication information of the second access network device. Therefore, after receiving the served cell information NR information unit in the list of served cells NR information unit, the first access network device can determine the full duplex communication information of the second access network device based on the newly added bit in the information unit according to the protocol.

It should be noted that the above example is only a schematic illustration and cannot be used as a limitation on the manner in which the served cell information NR information unit in the list of served cells NR information unit is expanded in the embodiment of the present disclosure.

Optionally, the neighbour cell information (neighbour information) NR information unit in the list of served cells NR information unit can also be extended, so that the neighbour information NR information unit can carry the first indication information, its specific content and implementation process will not be described again herein.

Optionally, the neighbour information evolved universal terrestrial radio access (E-UTRA) information unit in the list of served cells NR information unit can also be extended, so that the neighbour information E-UTRA information unit may carry the first indication information, and its specific content and implementation process will not be described again herein.

Optionally, the served cell information E-UTRA information unit in the list of served cells E-UTRA information unit can also be extended, so that the served cell information E-UTRA information unit can carry the first indication information, and its specific content and implementation process will not be described again herein.

Optionally, the neighbour information NR information unit in the list of served cells E-UTRA information unit can also be extended, so that the neighbour information NR information unit can carry the first indication information, and its specific content and implementation process will not be described again herein.

Optionally, the neighbour information E-UTRA information unit in the list of served cells E-UTRA information unit can also be extended, so that the neighbour information E-UTRA information unit can carry the first indication information, and its specific content and implementation process will not be described again herein.

Optionally, a designated information unit can also be added to the list of served cells NR information unit, so that the designated information unit can carry the first indication information, and its specific content and implementation process will not be described again herein.

Optionally, a designated information unit can also be added to the list of served cells E-UTRA information unit, so that the designated information unit can carry the first indication information, and its specific content and implementation process will not be described again herein.

In step 42, the second indication information is sent through an interface establishment request message, wherein the second indication information is used to indicate full duplex communication information of the first access network device.

The interface establishment response message may be an Xn setup response message, or it may be other interface establishment response messages, etc., which is not limited in this disclosure.

It can be understood that the interface establishment response message can be extended, so that the interface establishment response message can carry the second indication information.

For example, the protocol stipulates that a bit can be added to the interface establishment response message, and the added bit is used to indicate the full duplex communication information of the first access network device. Therefore, after receiving the interface establishment response message, other access network devices can determine the full duplex communication information of the first access network device based on the newly added bit in the message according to the protocol.

It should be noted that the above example is only a schematic illustration and cannot be used as a limitation on the manner in which the interface establishment response message is expanded in the embodiment of the present disclosure.

Optionally, after obtaining the full duplex communication information of the second access network device, the first access network device can also indicate the full duplex communication information of the second access network device to other access network devices. For example, the first access network device may send the second indication information, so that other access network devices can obtain the full duplex communication information of the second access network device and the first access network device based on the second indication information, and then the interference with the first access network device and the second access network device can be avoided as much as possible when other access network devices perform full duplex communication with the terminal device. In this way, the interference during the full duplex communication by access network devices can be reduced as much as possible, and the quality and efficiency of communication transmission are improved.

By implementing the embodiments of the present disclosure, the first access network device can receive the first indication information through the interface establishment request message, and then obtain the full duplex communication information of the second access network device according to the indication of the first indication information, and then may also send the second indication information through an interface establishment response message to indicate full duplex communication information of the first access network device. In this way, the interference during the full duplex communication by access network devices can be reduced as much as possible, and the quality and efficiency of communication transmission are improved.

Please refer to FIG. 5, FIG. 5 is a schematic flowchart of a networking method provided by an embodiment of the present disclosure. The method is executed by the first access network device. As shown in FIG. 5, the method may include but not limited to the following steps.

In step 51, the second indication information is sent through an interface establishment request message, wherein the second indication information is used to indicate full duplex communication information of the first access network device.

In step 52, the first indication information is received through an interface establishment response message, wherein the first indication information is used to indicate full duplex communication information of a second access network device.

It can be understood that the first access network device can receive the first indication information through an interface establishment response message, and then obtain the full duplex communication information of the second access network device according to the indication of the first indication information. Therefore, when the first access network device performs full duplex communication with the terminal device, the interference with the second access network device can be avoided as much as possible. In this way, the interference during the full duplex communication by access network devices can be reduced as much as possible, and the quality and efficiency of communication transmission are improved.

Optionally, the first indication information may be included in at least one of the following information units: a served cell information NR information unit in a list of served cells NR information unit; a neighbour cell information NR information unit in a list of served cells NR information unit; an evolved universal terrestrial radio access E-UTRA information unit of neighbour cell information in a list of served cells NR information unit; a served cell information E-UTRA information unit in a list of served cells E-UTRA information unit; a neighbour cell information NR information unit in a list of served cells E-UTRA information unit; a neighbour cell information E-UTRA information unit in a list of served cells E-UTRA information unit; a designated information unit in a list of served cells NR information unit; a designated information unit in a list of served cells E-UTRA information unit.

It should be noted that, as for the specific content and implementation manner of the first indication information that may be included in at least one of the following information units, reference may be made to the descriptions of other embodiments of the present disclosure and will not be described again here.

By implementing the embodiments of the present disclosure, the first access network device can send a second indication information through an interface establishment request message to indicate the full duplex communication information of the first access network device, and then can receive a first indication information through an interface establishment response message, and then obtain the full duplex communication information of the second access network device according to the indication of the first indication information, so that interference with the second access network device can be avoided as much as possible when performing full duplex communication. In this way, the interference during the full duplex communication by access network devices can be reduced as much as possible, and the quality and efficiency of communication transmission are improved.

Please refer to FIG. 6, FIG. 6 is a schematic flowchart of a networking method provided by an embodiment of the present disclosure. The method is executed by the first access network device. As shown in FIG. 6, the method may include but not limited to the following steps.

In step 61, the first indication information is received through a next generation radio access network device configuration update message, wherein the first indication information is used to indicate full duplex communication information of a second access network device.

Optionally, the first indication information may be included in at least one of the following information units: the gNB information unit in the NG RAN node configuration update message; and a next generation evolved access network device (next generation eNodeB, ng eNB) information unit in the NG RAN node configuration update message.

It can be understood that the gNB information unit in the NG RAN node configuration update message can be extended, so that the gNB information unit can carry the first indication information.

For example, the protocol stipulates that a bit can be added to the gNB information unit in the NG RAN node configuration update message, and the added bit is used to indicate the full duplex communication information of the second access network device. Therefore, after receiving the gNB information unit in the NG RAN node configuration update message, the first access network device can determine the full duplex communication information of the second access network device based on the newly added bit in the gNB information unit according to the protocol.

It should be noted that the above example is only a schematic explanation and cannot be used as a limitation on the manner in which the gNB information unit in the NG RAN node configuration update message is expanded in the embodiment of the present disclosure.

Alternatively, the ng eNB information unit in the NG RAN node configuration update message may also be extended, so that the ng eNB information unit may carry the first indication information. The specific content and implementation process will not be described again here.

In step 62, the first access network device communicates with the second access network device according to the first indication information and the full duplex communication information of the first access network device.

For example, the first access network device learns that the full duplex time domain resource supported by the second access network device is T1 according to the indication of the first indication information, and that the full duplex time domain resources supported by the first access network device is T1, T3 and T4, then the first access network device can perform full duplex communication with the second access network device on the time domain resource T1, thereby improving the quality and efficiency of the communication transmission between them two. This disclosure does not limit this.

By implementing the embodiments of the present disclosure, the first access network device can receive the first indication information through the next generation radio access network device configuration update message, and then can perform the communication with the second access network device according to the first indication information and the full duplex communication information of the first access network device. As a result, the quality and efficiency of full duplex communication transmission between access network devices can be improved.

In the above embodiments provided by the present disclosure, the method provided by the embodiments of the present disclosure is introduced from the perspective of the first access network device. In order to implement each function in the method provided by the above embodiments of the present disclosure, the first access network device may include a hardware structure and a software module, to implement the above functions in the form of a hardware structure, a software module, or a hardware structure plus a software module. A certain function among the above functions can be executed by a hardware structure, a software module, or a hardware structure plus a software module.

Please refer to FIG. 7, which is a schematic structural diagram of a communication apparatus 70 provided by an embodiment of the present disclosure. The communication apparatus 70 shown in the figure may include a transceiver module 701.

The transceiver module 701 may include a transmitting module and/or a receiving module. The transmitting module is used to implement the transmitting function, and the receiving module is used to implement the receiving function. The transceiver module 701 may implement the transmitting function and/or the receiving function.

It can be understood that the communication apparatus 70 may be the first access network device, or may be an apparatus in the first access network device, or may be an apparatus that can be used in conjunction with the first access network device.

The communication apparatus 70 includes:

a transceiver module 701, configured to receive first indication information, wherein the first indication information is used to indicate full duplex communication information of a second access network device.

Optionally, the full duplex communication information includes at least one of the following:

whether the second access network device supports full duplex;

full duplex capability information supported by the second access network device; and configuration information of full duplex communication of the second access network device.

Optionally, full duplex capability information supported by the second access network device includes at least one of the following:

supported full duplex frequency resources;

supported full duplex time domain resources; and supported full duplex types.

Optionally, the transceiver module 701 is specifically configured to:

receive the first indication information through an interface establishment request message; or, receive the first indication information through an interface establishment response message; or receive the first indication information through a next generation radio access network device configuration update message.

Optionally, the first indication information is included in at least one of the following information units:

a served cell information NR information unit in a list of served cells NR information unit;

a neighbour cell information NR information unit in a list of served cells NR information unit;

an evolved universal terrestrial radio access E-UTRA information unit of neighbour cell information in a list of served cells NR information unit;

a served cell information E-UTRA information unit in a list of served cells E-UTRA information unit;

a neighbour cell information NR information unit in a list of served cells E-UTRA information unit;

a neighbour cell information E-UTRA information unit in a list of served cells E-UTRA information unit;

a designated information unit in a list of served cells NR information unit;

a designated information unit in a list of served cells E-UTRA information unit;

a next generation access network device gNB information unit in a next generation radio access network device configuration update message; and a next generation evolved access network device ng eNB information unit in a next generation radio access network device configuration update message.

Optionally, the transceiver module 701 is further configured to send second indication information, wherein the second indication information is used to indicate full duplex communication information of the apparatus.

Optionally, the transceiver module 701 is further configured to:

send the second indication information through an interface establishment request message; or, send the second indication information through an interface establishment response message; or, send the second indication information through a next generation radio access network device configuration update message.

Optionally, the second indication information is further used to indicate full duplex communication information of the second access network device.

Optionally, the transceiver module 701 is further configured to communicate with the second access network device according to the first indication information and the full duplex communication information of the first access network device.

The communication apparatus provided by the present disclosure can obtain the full duplex communication information of the second access network device based on the received first indication information, so that interference with the second access network device can be avoided as much as possible when performing full duplex communication. In this way, the interference during the full duplex communication by access network devices can be reduced as much as possible, and the quality and efficiency of communication transmission are improved.

Figure 8:
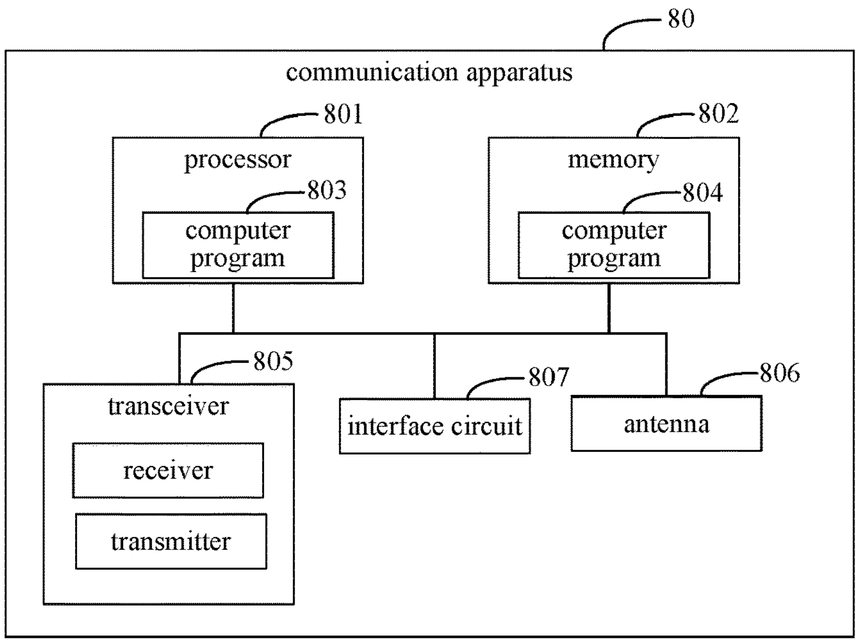
FIG. 8 is a schematic structural diagram of a communication apparatus according to another embodiment of the present disclosure.

Please refer to FIG. 8, which is a schematic structural diagram of a communication apparatus 80 provided by another embodiment of the present disclosure. The communication apparatus 80 may be a first access network device, or may be a chip, chip system, or processor that supports the first access network device to implement the above methods. The apparatus can be used to implement the methods described in the above method embodiments. For details, please refer to the description in the above method embodiments.

The communication apparatus 80 may include one or more processors 801. The processor 801 may be a general-purpose processor or a special-purpose processor, or the like. For example, the processor 801 may be a baseband processor or a central processor. The baseband processor can be used to process communication protocols and communication data. The central processor can be used to control the communication apparatus (such as a base station, baseband chip, terminal device, terminal device chip, DU or CU, etc.), and execute the computer programs, and process data of the computer programs.

Optionally, the communication apparatus 80 may also include one or more memories 802, on which a computer program 804 may be stored. The processor 801 executes the computer program 804, so that the communication apparatus 80 performs the steps described in the above method embodiments. Optionally, the memory 802 may also store data. The communication apparatus 80 and the memory 802 can be provided separately or integrated together.

Optionally, the communication apparatus 80 may also include a transceiver 805 and an antenna 806. The transceiver 805 may be called a transceiver unit, a transceiver, a transceiver circuit, etc., and is used to implement transceiver functions. The transceiver 805 may include a receiver and a transmitter. The receiver may be called a receiver or a receiving circuit, etc., which is used to implement the receiving function. The transmitter may be called a transmitter, a transmitting circuit, etc., which is used to implement the transmitting function.

Optionally, the communication apparatus 80 may also include one or more interface circuits 807. The interface circuit 807 is used to receive code instructions and transmit them to the processor 801. The processor 801 executes the code instructions to cause the communication apparatus 80 to perform the methods described in the above method embodiments.

The communication apparatus 80 is the first access network device. The transceiver 805 is used to perform step 21 in FIG. 2, step 31 in FIG. 3, step 32 in FIG. 3, step 33 in FIG. 3, step 41 in FIG. 4, step 42 in FIG. 4, step 51 in FIG. 5, step 52 in FIG. 5, step 61 in FIG. 6 or step 62 in FIG. 6.

In one implementation, the processor 801 may include a transceiver for implementing receiving and transmitting functions. For example, the transceiver may be a transceiver circuit, an interface, or an interface circuit. The transceiver circuit, interface or interface circuit used to implement the receiving and transmitting function can be separate or integrated together. The above transceiver circuit, interface or interface circuit can be used for reading and writing codes/data, or the above transceiver circuit, interface or interface circuit can be used for signal transmission or transfer.

In one implementation, the processor 801 may store a computer program 803, and the computer program 803 runs on the processor 801, causing the communication apparatus 80 to perform the method described in the above method embodiment. The computer program 803 may be solidified in the processor 801, in which case the processor 801 may be implemented by hardware.

In one implementation, the communication apparatus 80 may include a circuit, and the circuit may implement the functions of transmitting or receiving or communicating in the above method embodiments. The processors and transceivers described in this disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and transceiver can also be manufactured using various IC process technologies, such as complementary metal oxide semiconductor (CMOS), N-type metal oxide semiconductor (nMetal-oxide-semiconductor, NMOS), P-type metal oxide semiconductor (positive channel metal oxide semiconductor, PMOS), bipolar junction transistor (BJT), bipolar CMOS (BiCMOS), silicon germanium (SiGe), gallium arsenide (GaAs), etc.

The communication apparatus described in the above embodiments may be the first access network device, but the scope of the communication apparatus described in the present disclosure is not limited thereto, and the structure of the communication apparatus may not be limited by FIG. 8. The communication apparatus may be a stand-alone device or may be part of a large device. For example, the communication apparatus may be:

(1) an independent integrated circuit IC, or chip, or chip system or subsystem;

(2) a collection of one or more ICs. Optionally, the IC collection may also include storage components for storing data and computer programs;

(3) ASIC, such as Modem;

(4) a module that can be embedded in other devices;

(5) a receiver, terminal device, intelligent terminal device, cellular phone, wireless device, handheld machine, mobile unit, vehicle-mounted device, network device, cloud device, artificial intelligence device, etc.;

(6) Others, etc.

Figure 9:
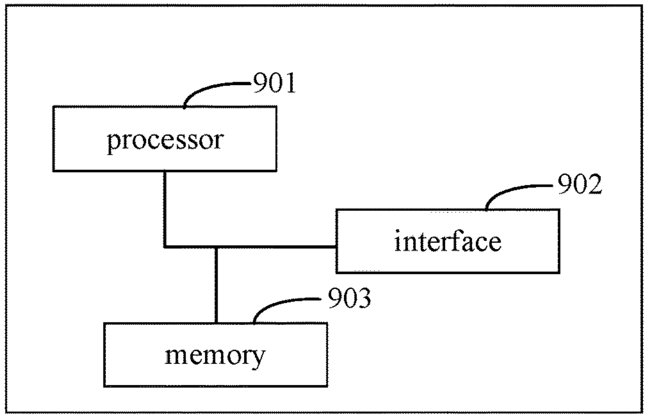
FIG. 9 is a schematic structural diagram of a chip according to an embodiment of the present disclosure.

For the case where the communication apparatus may be a chip or a chip system, please refer to the schematic structural diagram of the chip shown in FIG. 9. The chip shown in FIG. 9 includes a processor 901 and an interface 902. The number of processors 901 may be one or more, and the number of interfaces 902 may be plural.

For the case where the chip is used to implement the functions of the first access network device in the embodiment of the present disclosure:

an interface 902 is used to execute step 21 in FIG. 2, step 31 in FIG. 3, step 32 in FIG. 3, step 33 in FIG. 3, step 41 in FIG. 4, step 42 in FIG. 4, step 51 in FIG. 5, step 52 in FIG. 5, step 61 in FIG. 6 or step 62 in FIG. 6.

Optionally, the chip also includes a memory 903, which is used to store necessary computer programs and data.

Those skilled in the art can also understand that the various illustrative logical blocks and steps listed in the embodiments of the present disclosure can be implemented by electronic hardware, computer software, or a combination thereof. Whether such function is implemented in hardware or software depends on the specific application and overall system design requirements. Those skilled in the art can use various methods to implement the described functions for each specific application, but such implementation should not be understood as going beyond the protection scope of embodiments of the present disclosure.

Embodiments of the present disclosure also provide a networking system. The system includes the communication apparatus as the first access network device in the embodiment of FIG. 7, or the system includes the communication apparatus as the first access network device in the embodiment of FIG. 8.

The present disclosure also provides a non-transitory computer-readable storage medium on which instructions are stored. When the instructions are executed by a computer, the functions of any of the above method embodiments are implemented.

The present disclosure also provides a computer program product, which, when executed by a computer, implements the functions of any of the above method embodiments.

Embodiments of the present disclosure provide a networking method and apparatus, which can be applied in the field of communication technology. The first access network device can obtain the full duplex communication information of the second access network device based on the received first indication information, so that interference with the second access network device can be avoided as much as possible when performing full duplex communication. In this way, the interference during the full duplex communication by access network devices can be reduced as much as possible, and the quality and efficiency of communication transmission are improved.

In a first aspect, embodiments of the present disclosure provide a method of networking, performed by a first access network device, and the method including: receiving first indication information, wherein the first indication information is used to indicate full duplex communication information of a second access network device.

In the technical solution, the first access network device can obtain the full duplex communication information of the second access network device based on the received first indication information, so that interference with the second access network device can be avoided as much as possible when performing full duplex communication. In this way, the interference during the full duplex communication by access network devices can be reduced as much as possible, and the quality and efficiency of communication transmission are improved.

Optionally, the full duplex communication information includes at least one of the following:

whether the second access network device supports full duplex;

full duplex capability information supported by the second access network device; and configuration information of full duplex communication of the second access network device.

Optionally, full duplex capability information supported by the second access network device includes at least one of the following:

supported full duplex frequency resources;

supported full duplex time domain resources; and supported full duplex types.

Optionally, receiving first indication information includes:

receiving the first indication information through an interface establishment request message; or, receiving the first indication information through an interface establishment response message; or receiving the first indication information through a next generation radio access network device configuration update message.

In the technical solution, the first access network device can receive the first indication information in various manners, thus making the manners of receiving the first indication information more flexible and diverse. In this way, the first access network device can obtain the full duplex communication information of the second access network device based on the received indication information, so that interference with the second access network device can be avoided as much as possible when performing full duplex communication. In this way, the interference during the full duplex communication by access network devices can be reduced as much as possible, and the quality and efficiency of communication transmission are improved.

Optionally, the first indication information is included in at least one of the following information units:

a served cell information NR information unit in a list of served cells NR information unit;

a neighbour cell information NR information unit in a list of served cells NR information unit;

an evolved universal terrestrial radio access E-UTRA information unit of neighbour cell information in a list of served cells NR information unit;

a served cell information E-UTRA information unit in a list of served cells E-UTRA information unit;

a neighbour cell information NR information unit in a list of served cells E-UTRA information unit;

a neighbour cell information E-UTRA information unit in a list of served cells E-UTRA information unit;

a designated information unit in a list of served cells NR information unit;

a designated information unit in a list of served cells E-UTRA information unit;

a next generation access network device gNB information unit in a next generation radio access network device configuration update message; and a next generation evolved access network device ng eNB information unit in a next generation radio access network device configuration update message.

In this technical solution, the first indication information can have various forms, so that the first access network device receives the first indication information in a more flexible and diverse way. In this way, the first access network device can obtain the full duplex communication information of the second access network device based on the received indication information, so that interference with the second access network device can be avoided as much as possible when performing full duplex communication. In this way, the interference during the full duplex communication by access network devices can be reduced as much as possible, and the quality and efficiency of communication transmission are improved.

Optionally, the method further includes:

sending second indication information, wherein the second indication information is used to indicate full duplex communication information of the first access network device.

In this technical solution, the first access network device can send the second indication information, so that interference with the first access network device can be avoided as much as possible when performing full duplex communication by other access network devices. In this way, the interference during the full duplex communication by access network devices can be reduced as much as possible, and the quality and efficiency of communication transmission are improved.

Optionally, sending second indication information includes:

sending the second indication information through an interface establishment request message; or, sending the second indication information through an interface establishment response message; or, sending the second indication information through a next generation radio access network device configuration update message.

In this technical solution, the first access network device can send the second indication information in various manners, thus making the manners of sending the second indication information more flexible and diverse.

Optionally, the second indication information is further used to indicate full duplex communication information of the second access network device.

Optionally, the method further includes:

communicating with the second access network device according to the first indication information and the full duplex communication information of the first access network device.

In this technical solution, the quality and efficiency of full duplex communication transmission between the first access network device and the second access network device can be improved.

In a second aspect, embodiments of the present disclosure provide a communication apparatus, which has some or all functions of implementing the first access network device in the method described in the first aspect. For example, the functions of the communication apparatus can have functions of some or all embodiment of the present disclosure, and can also have the functions of independently implementing any embodiment of the present disclosure. The functions can be realized by hardware, or by hardware executing corresponding software. The hardware or software includes one or more units or modules corresponding to the above functions.

In one implementation, the structure of the communication apparatus may include a transceiver module and a processing module. The processing module is configured to support the communication apparatus to perform the corresponding functions in the above method. The transceiver module is used to support communication between the communication apparatus and other devices. The communication apparatus may further include a storage module for coupling with the transceiver module and the processing module, and storing necessary computer programs and data of the communication apparatus.

As an example, the processing module can be a processor, the transceiver module can be a transceiver or a communication interface, and the storage module can be a memory.

The communication apparatus provided by the present disclosure can obtain the full duplex communication information of the second access network device based on the received first indication information, so that interference with the second access network device can be avoided as much as possible when performing full duplex communication. In this way, the interference during the full duplex communication by access network devices can be reduced as much as possible, and the quality and efficiency of communication transmission are improved.

In a third aspect, embodiments of the present disclosure provide a communication apparatus, which includes a processor, and when the processor calls a computer program in a memory, the method described in the first aspect is executed.

In a fourth aspect, an embodiment of the present disclosure provides a communication apparatus, which includes a processor and a memory, and a computer program is stored in the memory. The processor executes the computer program stored in the memory, so that the communication apparatus performs the method described in the first aspect.

In a fifth aspect, an embodiment of the present disclosure provides a communication apparatus, which includes a processor and an interface circuit. The interface circuit is used for receiving code instructions and transmitting them to the processor, and the processor is used for running the code instructions to enable the apparatus to perform the method described in the first aspect.

In a sixth aspect, an embodiment of the present disclosure provides a networking system, which includes the communication apparatus described in the second aspect, or the system includes the communication apparatus described in the third aspect, or the system includes the communication apparatus described in the fourth aspect, or the system includes the communication apparatus described in the fifth aspect.

In a seventh aspect, an embodiment of the present disclosure provides a non-transitory computer-readable storage medium, for storing instructions used by the first access network device, and when the instructions are executed, the method described in the first aspect is implemented.

In an eighth aspect, the present disclosure also provides a computer program product including a computer program, which, when run on a computer, causes the computer to perform the method described in the first aspect.

In a ninth aspect, the present disclosure provides a chip system, which includes at least one processor and interface, and is used for supporting a first access network device to realize functions related to the first aspect, for example, determining or processing at least one of data and information related to the above method. In a possible design, the chip system further includes a memory, and the memory is used for storing necessary computer programs and data of the first access network device. The chip system can be composed of chips, and can also include chips and other discrete devices.

In a tenth aspect, the present disclosure provides a non-transitory computer program, which when run on a computer, causes the computer to perform the method described in the first aspect.

In the above embodiments, it may be implemented in whole or in part by software, hardware, firmware, or any combination thereof. When implemented using software, it may be implemented in whole or in part in the form of a computer program product. The computer program product includes one or more computer programs. When the computer program is loaded and executed on a computer, the processes or functions described in accordance with the embodiments of the present disclosure are generated in whole or in part. The computer may be a general-purpose computer, a special-purpose computer, a computer network, or other programmable apparatus. The computer program may be stored in the non-transitory computer-readable storage medium, or transferred from one non-transitory computer-readable storage medium to another non-transitory computer-readable storage medium. For example, the computer program may be transferred from a website, computer, server, or data center to another website, computer, server or data center via wired (such as coaxial cable, optical fiber, digital subscriber line (DSL)) or wireless (such as infrared, wireless, microwave, etc.) manners. The non-transitory computer-readable storage medium may be any available medium that can be accessed by a computer or a data storage device such as a server, data center, etc. that contains one or more available media integrated. The available media may be magnetic media (e.g., floppy disks, hard disks, magnetic tapes), optical media (e.g., high-density digital video disc (DVD)), or semiconductor media (e.g., solid state disks, SSD)) etc.

Those of ordinary skill in the art can understand that the first, second, and other numerical numbers involved in this disclosure are only for convenience of description and are not used to limit the scope of the embodiments of the disclosure, nor to indicate the order.

At least one in the present disclosure can also be described as one or plural, and the plural can be two, three, four or more, and the present disclosure does not limit this. In the embodiment of the present disclosure, for a technical feature, the technical features among the type of technical features are distinguished by “first”, “second”, “third”, “A”, “B”, “C” and “D” etc. The technical features described with “first”, “second”, “third”, “A”, “B”, “C” and “D” are in no particular sequential order or size order.

The corresponding relationships shown in each table in this disclosure can be configured or predefined. The values of the information in each table are only examples and can be configured as other values, which is not limited by this disclosure. When configuring the correspondence between information and each parameter, it is not necessarily required to configure all the correspondences shown in each table. For example, in the table in this disclosure, the corresponding relationships shown in some rows may not be configured. For another example, appropriate deformation adjustments can be made based on the above table, such as splitting, merging, etc. The names of the parameters shown in the titles of the above tables may also be other names understandable by the communication apparatus, and the values or expressions of the parameters may also be other values or expressions understandable by the communication apparatus. When implementing the above tables, other data structures can also be used, for example, arrays, queues, containers, stacks, linear lists, pointers, linked lists, trees, graphs, structures, classes, heaps, hash tables can be used.

Predefinition in this disclosure may be understood as definition, pre-definition, storage, pre-storage, pre-negotiation, pre-configuration, solidification, or pre-burning.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solution. Those skilled in the art can implement the described functionality using different methods for each specific application, but such implementations should not be considered as going beyond the scope of this disclosure.

Those skilled in the art can clearly understand that for the convenience and simplicity of description, the specific working processes of the systems, apparatuses and units described above can be referred to the corresponding processes in the foregoing method embodiments, and will not be described again here.

The above are only specific embodiments of the present disclosure, but the protection scope of the present disclosure is not limited thereto. Any change or substitution easily conceived by any person familiar with the technical field within the technical scope disclosed in the present disclosure should be covered by the protection scope of this disclosure. Therefore, the protection scope of the present disclosure should be subject to the protection scope of the claims.

What is claimed is:

1. A method of networking, performed by a first access network device, comprising:

receiving first indication information from a second access network device, wherein the first indication information is configured to indicate full duplex communication information of a second access network device;

sending second indication information to the second access network device, wherein the second indication information is configured to indicate full duplex communication information of the first access network device, wherein the full duplex communication information comprises at least one of the following:

whether the second access network device supports full duplex;

full duplex capability information supported by the second access network device; and configuration information of full duplex communication of the second access network device, wherein the full duplex capability information supported by the second access network device comprises at least one of the following:

supported full duplex frequency resources;

supported full duplex time domain resources; and supported full duplex types, wherein the full duplex type is frequency division multiplexing (FDM) or time division multiplexing (TDM); and performing full duplex communication with a terminal based on resources different from full duplex time domain resources or full duplex frequency resources within a same time domain based on the first indication information from the second access network device.

2. The method according to claim 1, wherein receiving the first indication information comprises:

receiving the first indication information through an interface establishment request message; or receiving the first indication information through an interface establishment response message; or receiving the first indication information through a next generation radio access network device configuration update message.

3. The method according to claim 2, wherein the first indication information is comprised in at least one of the following information units:

a served cell information new radio (NR) information unit in a served cells list NR information unit;

a neighbour cell information NR information unit in a served cells list NR information unit;

an evolved universal terrestrial radio access (E-UTRA) information unit of neighbour cell information in a served cells list NR information unit;

a served cell information E-UTRA information unit in a served cells list E-UTRA information unit;

a neighbour cell information NR information unit in a served cells list E-UTRA information unit;

a neighbour cell information E-UTRA information unit in a served cells list E-UTRA information unit;

a designated information unit in a served cells list NR information unit;

a designated information unit in a served cells list E-UTRA information unit;

a next generation access network device next generation NodeB (gNB) information unit in a next generation radio access network device configuration update message; and a next generation evolved access network device next generation evolved NodeB (ng eNB) information unit in a next generation radio access network device configuration update message.

4. The method according to claim 1, wherein sending the second indication information comprises:

sending the second indication information through an interface establishment request message; or sending the second indication information through an interface establishment response message; or sending the second indication information through a next generation radio access network device configuration update message.

5. The method according to claim 1, wherein the second indication information is further configured to indicate the full duplex communication information of the second access network device.

6. The method according to claim 1, further comprising:

communicating with the second access network device according to the first indication information and the full duplex communication information of the first access network device.

7. A communication apparatus, comprising:

a processor and a memory, wherein a computer program is stored in the memory and executed by the processor, and the processor is configured to:

receive first indication information from a second access network device, wherein the first indication information is configured to indicate full duplex communication information of a second access network device;

send second indication information to the second access network device, wherein the second indication information is configured to indicate full duplex communication information of the first access network device, wherein the full duplex communication information comprises at least one of the following:

whether the second access network device supports full duplex;

full duplex capability information supported by the second access network device; and configuration information of full duplex communication of the second access network device, wherein the full duplex capability information supported by the second access network device comprises at least one of the following:

supported full duplex frequency resources;

supported full duplex time domain resources; and supported full duplex types, wherein the full duplex type is frequency division multiplexing (FDM) or time division multiplexing (TDM); and perform full duplex communication with a terminal based on resources different from full duplex time domain resources or full duplex frequency resources within a same time domain based on the first indication information from the second access network device.

8. The apparatus according to claim 7, wherein the processor is further configured to:

receive the first indication information through an interface establishment request message; or receive the first indication information through an interface establishment response message; or receive the first indication information through a next generation radio access network device configuration update message.

9. The apparatus according to claim 8, wherein the first indication information is comprised in at least one of the following information units:

a served cell information new radio (NR) information unit in a served cells list NR information unit;

a neighbour cell information NR information unit in a served cells list NR information unit;

an evolved universal terrestrial radio access (E-UTRA) information unit of neighbour cell information in a served cells list NR information unit;

a served cell information E-UTRA information unit in a served cells list E-UTRA information unit;

a neighbour cell information NR information unit in a served cells list E-UTRA information unit;

a neighbour cell information E-UTRA information unit in a served cells list E-UTRA information unit;

a designated information unit in a served cells list NR information unit;

a designated information unit in a served cells list E-UTRA information unit;

a next generation access network device next generation NodeB (gNB) information unit in a next generation radio access network device configuration update message; and a next generation evolved access network device next generation evolved NodeB (ng eNB) information unit in a next generation radio access network device configuration update message.

10. The apparatus according to claim 7, wherein the processor is further configured to:

send the second indication information through an interface establishment request message; or send the second indication information through an interface establishment response message; or send the second indication information through a next generation radio access network device configuration update message.

11. The apparatus according to claim 7, wherein the second indication information is further configured to indicate the full duplex communication information of the second access network device.

12. The apparatus according to claim 7, wherein the processor is further configured to:

communicate with the second access network device according to the first indication information and the full duplex communication information of the first access network device.

13. A communication apparatus, comprising: a processor and an interface circuit, wherein the interface circuit is configured to receive code instructions and transmit the code instructions to the processor;

the processor is configured to run the code instructions to receive first indication information from a second access network device, wherein the first indication information is configured to indicate full duplex communication information of a second access network device;

send second indication information to the second access network device, wherein the second indication information is configured to indicate full duplex communication information of the first access network device, wherein the full duplex communication information comprises at least one of the following:

whether the second access network device supports full duplex;

full duplex capability information supported by the second access network device; and configuration information of full duplex communication of the second access network device, wherein the full duplex capability information supported by the second access network device comprises at least one of the following:

supported full duplex frequency resources;

supported full duplex time domain resources; and supported full duplex types, wherein the full duplex type is frequency division multiplexing (FDM) or time division multiplexing (TDM); and perform full duplex communication with a terminal based on resources different from full duplex time domain resources or full duplex frequency resources within a same time domain based on the first indication information from the second access network device.

14. A non-transitory computer-readable storage medium, configured to store instructions that executable to implement the method according to claim 1.

* * * * *